United States Patent
Cheng et al.

(10) Patent No.: US 10,530,593 B2
(45) Date of Patent: Jan. 7, 2020

(54) MULTI-USER CONFERENCING SYSTEM

(71) Applicant: Shuyi Cheng, Shanghai (CN)

(72) Inventors: Shuyi Cheng, Shanghai (CN); Aiguo Zhou, Shanghai (CN); Quan Zhou, Shanghai (CN); Yingzhe Cui, Shanghai (CN); Tiankun Zhu, Shanghai (CN); Zheng Yuan, Shanghai (CN)

(73) Assignee: Shuyi Cheng, Shanghai (CN)

( * ) Notice: Subject to any disclaimer, the term of this patent is extended or adjusted under 35 U.S.C. 154(b) by 262 days.

(21) Appl. No.: 15/820,967

(22) Filed: Nov. 22, 2017

(65) Prior Publication Data
US 2018/0097648 A1    Apr. 5, 2018

Related U.S. Application Data

(63) Continuation of application No. PCT/CN2015/079741, filed on May 25, 2015.

(51) Int. Cl.
*G06F 15/16* (2006.01)
*H04L 12/18* (2006.01)
(Continued)

(52) U.S. Cl.
CPC ...... *H04L 12/1822* (2013.01); *H04L 65/1069* (2013.01); *H04L 65/403* (2013.01); *H04L 67/38* (2013.01); *H04M 3/567* (2013.01)

(58) Field of Classification Search
CPC ... H04L 12/1822; H04L 65/403; H04M 3/567
(Continued)

(56) References Cited

U.S. PATENT DOCUMENTS 7,751,347 B2 *  7/2010  Giroti ............... H04L 12/1822
                                                  370/260
8,289,366 B2 * 10/2012  Greenwood ............ H04N 7/15
                                                  348/14.01
(Continued)

FOREIGN PATENT DOCUMENTS

CN        1529257 A      9/2004
CN      101536558 A      9/2009
(Continued)

OTHER PUBLICATIONS

Notice of Allowance dated Apr. 1, 2019 for Appl ication No. JP 2018-512462.
(Continued)

*Primary Examiner* — Bharat Barot
(74) *Attorney, Agent, or Firm* — Ladas & Parry LLP

(57) ABSTRACT

The present invention discloses a multi-user conferencing system, where the multi-user conferencing system includes an infrared device and a cloud server, where the infrared device having no display screen is communicatively connected to the cloud server and creates a conference; the infrared device determines, according to a distribution situation of infrared rays blocked by a writing object operated by a user in the conference, coordinate information of the writing object, and sends the coordinate information to the cloud server; and a terminal participating in the conference acquires data from the cloud server, and reproduces writing content during the conference. A multi-user conferencing system in embodiments of the present invention may save data traffic generated by a conference, and enhance data processing speed.

18 Claims, 2 Drawing Sheets

(51) Int. Cl.
*H04L 29/06* (2006.01)
*H04M 3/56* (2006.01)

(58) Field of Classification Search
USPC .................................................. 709/202–205
See application file for complete search history.

(56) References Cited

U.S. PATENT DOCUMENTS

| | | | |
|---|---|---|---|
| 8,711,198 B2* | 4/2014 | Malzbender | H04N 7/147 |
| | | | 348/14.03 |
| 9,679,567 B2* | 6/2017 | Doyle | H04L 65/1076 |
| 2010/0067674 A1 | 3/2010 | Lee | |
| 2015/0095805 A1 | 4/2015 | Shibayama | |

FOREIGN PATENT DOCUMENTS

| | | |
|---|---|---|
| CN | 103458221 A | 12/2013 |
| CN | 104519306 A | 4/2015 |
| DE | 102006049681 A1 | 4/2008 |
| JP | 2006162692 A | 6/2006 |
| JP | 2011-53629 A | 3/2011 |
| JP | 2011524572 A | 9/2011 |
| JP | 2013-136154 A | 7/2013 |
| JP | 2013-186898 A | 9/2013 |
| JP | 201568988 A | 4/2015 |
| JP | 2015141327 A | 8/2015 |

OTHER PUBLICATIONS

English abstract of JP 201568988 A.
English abstract of JP 2015141327 A.
English abstract of JP 2006162692 A.
English abstract of JP 2011524572 A.
English abstract of DE 102006049681 A1.
Japanese Office Action dated Dec. 3, 2018 for Application No. JP 2018-512462 with English translation.
English abstract of JP 2013-186898 A.
English abstract of JP 2013-136154 A.
English abstract of JP 2011-53629 A.
International Search Report dated Feb. 2, 2016 for Application No. PCT/CN2015/079741.
English abstract of CN 1529257 A.
English abstract of CN 101536558 A.
English abstract of CN 103458221 A.
English abstract of CN 104519306 A.

* cited by examiner

MULTI-USER CONFERENCING SYSTEM

CROSS-REFERENCE TO RELATED APPLICATIONS

This application is a continuation of International Application No. PCT/CN2015/079741, filed on May 25, 2015, which is hereby incorporated by reference in its entirety.

TECHNICAL FIELD

Embodiments of the present invention relate to a multi-user conferencing system, and more particularly, to a multi-user conferencing system based on non-image data transmission.

BACKGROUND

Currently, with the rapid development of communications technology, more and more companies and individuals hold multi-user conferences over the network. Existing multi-user conferencing systems are mostly based on a video. A video conferencing system is generally composed of parts such as a video conferencing terminal, a multipoint control unit (Multipoint Control Unit, MCU), a network management system and a transmission network. The video conferencing terminal and the MCU encode, pack and send information such as an image, a video and an audio in a conference scene; and a terminal decodes a received data packet into an image, a video, an audio, and the like.

Data transmitted by an existing video conferencing system is based on an image or a video, and thus data amount transmitted is very large, which has a higher demand for network processing speed and network traffic. In addition, conference content also requires a larger storage space, which results in higher costs for a video conferencing system.

SUMMARY

Embodiments of the present invention provide a multi-user conferencing system which may transmit conference content based on non-image data, thereby reducing demand of the conferencing system for network traffic.

Embodiments of the present invention provide a multi-user conferencing system, wherein the multi-user conferencing system includes an infrared device and a cloud server, wherein the infrared device has no display screen and is placed on a writing bearing medium in use, the infrared device, the cloud server and terminals used by a plurality of users create and participate in a conference, the infrared device includes a network setting module, an infrared ray position detecting module and a data processing module;

the network setting module is configured to communicatively connect the infrared device to an assisting device to assist the infrared device in connecting to the cloud server, so that the infrared device and the cloud server create the conference;

the infrared ray position detecting module is configured to determine, according to a distribution situation of infrared rays blocked by a writing object operated by a user on the writing bearing medium, coordinate information of the writing object on the writing bearing medium, and send the coordinate information to the data processing module;

the data processing module is configured to acquire integrated data after processing the coordinate information, and send the integrated data to the cloud server; and the cloud server is configured to store the integrated data, and send the integrated data to the terminals so that the terminals reproduce writing content on the writing bearing medium according to the integrated data.

Preferably, the network setting module communicatively connects the infrared device to the assisting device based on Bluetooth technology or infrared technology, and performs setting through a setting page provided by an application client on the assisting device so as to connect the infrared device to the cloud server or modify network setting of the infrared device.

Preferably, the integrated data includes a physical identifier for indicating the infrared device, and the cloud server allocates a corresponding storage space for the infrared device according to the physical identifier, and stores the integrated data in the storage space.

Preferably, the multi-user conferencing system allocates a conference identifier for the conference, and the terminals input the conference identifier via an application client to access the conference.

Preferably, the data processing module communicates with the cloud server via a WLAN network or a mobile communication network.

Preferably, the integrated data includes coordinate information acquired by the infrared ray position detecting module in time sequence, so that the terminals reproduce a writing process according to the coordinate information acquired in time sequence.

Preferably, the integrated data includes the coordinate information and time information corresponding to the coordinate information, so that the terminals reproduce a writing process according to the time information and the coordinate information.

Preferably, the infrared device is further configured to be externally connected to an audio device so as to input or output audio data via the audio device.

Preferably, the infrared device further includes an audio module so as to input or output audio data via the audio module.

Preferably, the infrared device is further configured to be externally connected to a local reproduction device, and the data processing module is further configured to send the integrated data to the local reproduction device so that the local reproduction device reproduces content of the conference locally according to the integrated data.

Preferably, the cloud server is further configured to be communicatively connected to a local reproduction device, and the cloud server sends the integrated data to the local reproduction device so that the local reproduction device reproduces content of the conference locally according to the integrated data.

Preferably, the local reproduction device is a display device or a printing device.

Preferably, the local reproduction device is connected to the infrared device via a line, a WLAN, Bluetooth technology or infrared technology.

Preferably, the infrared device further includes a local storage module, and the local storage module is configured to record in time and store the integrated data currently corresponding to the writing bearing medium.

Preferably, the data processing module is specifically configured to send the integrated data corresponding to one page of the writing bearing medium that is stored in the local storage module to the cloud server when the page of the writing bearing medium has been written.

Preferably, the data processing module sends the integrated data stored in the local storage module to the cloud server when a power supply of the infrared ray position detecting module is turned off, and the integrated data stored in the local storage module is not cleared.

Preferably, the data processing module is further configured to detect whether a currently acquired coordinate coincides with a coordinate in the integrated data stored in the local storage module, and when the currently acquired coordinate coincides with the coordinate in the integrated data stored in the local storage module, the data processing module sends the integrated data stored in the local storage module to the cloud server, and deletes the integrated data in the local storage module that has already been sent to the cloud server.

Based on the above technical solutions, a multi-user conferencing system provided by the embodiments of the present invention determines coordinate information of a writing object based on the influence of the writing object on a distribution situation of infrared rays of an infrared device when a user performs writing in a conference, and sends integrated data acquired after processing the coordinate information to a cloud server so that terminals participating in the conference reproduce writing content in the conference according to the integrated data. The multi-user conferencing system may transmit the conference content based on non-image data, thereby saving data traffic generated by the conference, and enhancing data processing speed.

BRIEF DESCRIPTION OF DRAWINGS

In order to illustrate the technical solutions in embodiments of the present invention more clearly, brief description will be made below to the drawings required in the embodiments or the prior art, and apparently, the drawings described below are some embodiments of the present invention only, and other drawings could be obtained based on these drawings by those of ordinary skill in the art without creative efforts.

DESCRIPTION OF EMBODIMENTS

The technical solution in the embodiments of the present invention will be described clearly and fully below in conjunction with the drawings in the embodiments of the present invention, and apparently, the embodiments described are only part of embodiments of the present invention, not all of them. All other embodiments obtained by persons of ordinary skill in the art based on the embodiments of the present invention without creative efforts shall fall within the protection scope of the present invention.

It shall be understood that a terminal in the embodiments of the present invention may be also referred to as user equipment (User Equipment, UE), a mobile terminal (Mobile Terminal) or a mobile user equipment, and the like, which may communicate with one or more core networks via a wireless access network (such as Radio Access Network, RAN). The user equipment may be a mobile terminal such as a mobile phone (or referred to as a "cellular" phone) and a computer having a mobile terminal, for example, it may be a portable, pocket, hand-held, computer built-in or vehicle-mounted mobile device which exchanges language and/or data with a wireless access network, which is not limited in the embodiment of the present invention.

A mobile communications network in the embodiments of the present invention may be for example a global system of mobile communication (Global System of Mobile communication, GSM) network, a code division multiple access (Code Division Multiple Access, CDMA) system network, a wide band code division multiple access wireless (Wide band Code Division Multiple Access Wireless, WCDMA) network, a general packet radio service (General Packet Radio Service, GPRS) network, a universal mobile telecommunications system (Universal Mobile Telecommunications System, UMTS) network, a long term evolution (Long Term Evolution, LTE) network, etc.

Figure 1:
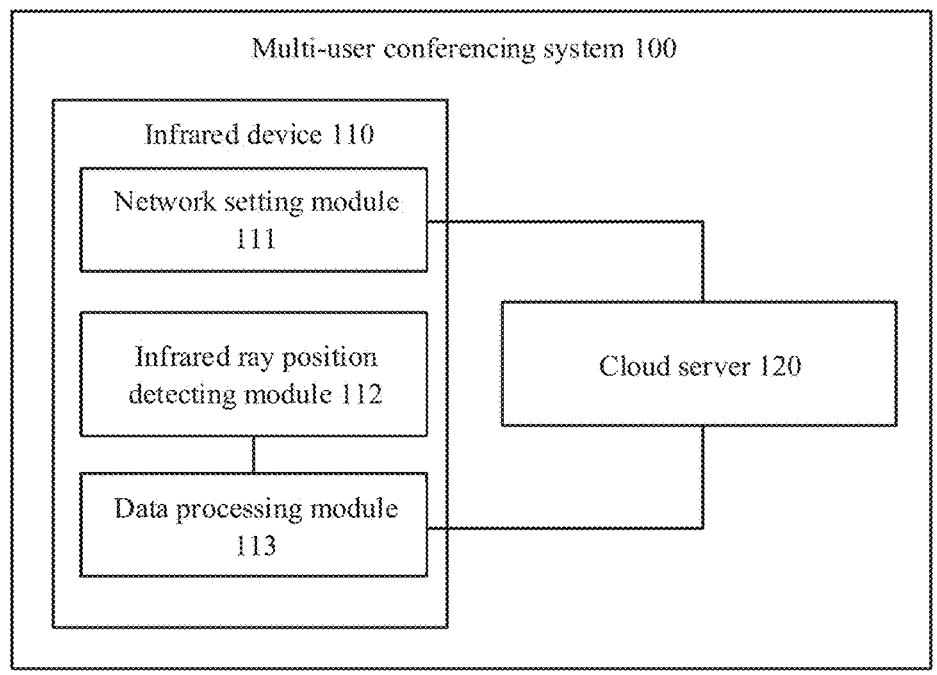
FIG. 1 is a schematic block diagram of a multi-user conferencing system according to an embodiment of the present invention.

FIG. 1 illustrates a schematic block diagram of a multi-user conferencing system 100 according to an embodiment of the present invention. As shown in FIG. 1, the multi-user conferencing system 100 includes an infrared device 110 and a cloud server 120, where the infrared device 110 has no display screen and is placed on a writing bearing medium in use, the infrared device 110, the cloud server 120 and terminals used by a plurality of users create and participate in a conference, the infrared device 110 includes a network setting module 111, an infrared ray position detecting module 112 and a data processing module 113.

The network setting module 111 is configured to communicatively connect the infrared device 110 to an assisting device to assist the infrared device 110 in connecting to the cloud server 120, so that the infrared device 110 and the cloud server 120 create the conference.

The infrared ray position detecting module 112 is configured to determine, according to a distribution situation of infrared rays blocked by a writing object operated by a user on the writing bearing medium, coordinate information of the writing object on the writing hearing medium, and send the coordinate information to the data processing module 113.

The data processing module 113 is configured to acquire integrated data after processing the coordinate information, and send the integrated data to the cloud server 120.

And the cloud server 120 is configured to store the integrated data, and send the integrated data to the terminals so that the terminals reproduce writing content on the writing bearing medium according to the integrated data.

Therefore, a multi-user conferencing system provided by the embodiments of the present invention determines coordinate information of a writing object based on the influence of the writing object on a distribution situation of infrared rays of an infrared device when a user performs writing in a conference, and sends integrated data acquired after processing the coordinate information to a cloud server so that terminals participating in the conference reproduce writing content in the conference according to the integrated data. The multi-user conferencing system may transmit the conference content based on non-image data, thereby saving data traffic generated by the conference, and enhancing data processing speed.

Specifically, the infrared device 110 in the embodiment of the present invention has no display screen and is placed on the writing bearing medium in use to acquire the writing coordinate on the writing bearing medium. The writing hearing medium may be a white board, a blackboard, a glass board or a piece of paper for writing, etc. The writing object for writing content on the writing bearing medium may be a mark pen, a pen, a ball-point pen, a pencil, a chalk, an eraser, a blackboard eraser, a white board eraser, even a finger, and any tool that can be used to write out a trajectory, and the specific forms of the writing bearing medium and the writing object are not limited in the embodiment of the present invention. The infrared device in the embodiment of the present invention has no display screen, but uses conventional writing bearing medium and writing tool, which can reduce costs of a conferencing system on one hand, and suit use habits of people better on the other hand, thereby improving user experience.

The network setting module 111 is configured to set networking parameters of the multi-user conferencing system 100. The network setting module 111 may be connected to the assisting device via Bluetooth technology, infrared technology or a data channel such as a USB, and connected to the designated cloud server 120 in a manner that the assisting device inputs network configuration parameters of the infrared device 110. When the infrared device 110 is connected to the cloud server 120 for the first time, corresponding network configuration parameters may be stored in a local storage module (not shown in FIG. 1) of the infrared device 110. When the infrared device 110 is activated once again, the infrared device 110 may be connected to the cloud server 120 automatically according to the network configuration parameters stored in the local storage module, which is not limited in the embodiment of the present invention. After the infrared device 110 is connected to the cloud server 120, a conference may be created to transmit conference content.

It shall be understood that the assisting device in the embodiment of the present invention may be a terminal used by a user participating in a conference, or other input assisting devices, which is not limited in the embodiment of the present invention. The data processing module 113 may perform a certain degree of beautification processing on the coordinate information received from the infrared ray position detecting module 112, such as performing smoothing processing on the coordinate information, to smooth lines of the writing content. Of course, smoothing and beautification of the coordinate information may also be executed by the terminal or a client on the terminal, which is not limited in the embodiment of the present invention.

The infrared ray position detecting module 112 is configured to determine coordinate information of the writing object according to a distribution situation of infrared rays blocked by a writing object operated by a user during the conference. Specifically, the infrared ray position detecting module 112 may be an infrared emitting unit, an infrared receiving unit and a corresponding electronic processing unit. The infrared ray position detecting module 112 may be a closed infrared frame in a fixed size, or may be a plurality of infrared emitting arrays and a plurality of infrared receiving arrays of an infrared frame that are freely assembled according to a size as required by a user, or may further be an infrared ray position detecting module or an infrared frame in other forms, which is not limited in the embodiment of the present invention.

It shall be understood that the infrared ray position detecting module 112 determines coordinate information of the writing object at different moments in time, and the coordinate information may further include size dimension of the writing object. Corresponding to its software function in the system, the size dimension of the writing object may generate functional attribute information of coordinate data. The functional attribute information may include writing/erasing, content color, handwriting thickness, and the like, which is not limited in the embodiment of the present invention.

The infrared ray position detecting module 112 sends original data corresponding to the coordinate information to the data processing module 113. The data processing module 113 acquires integrated data after processing the coordinate information, and sends the integrated data to the cloud server 120. The data processing module 113 records, recognizes, integrates and transmits the data.

The data processing module 113 records the coordinate information (including position coordinate data, size data, etc.) detected by the infrared ray position detecting module 112. The data processing module 113 may further recognize the writing object according to the size of the writing object collected by the infrared ray position detecting module 112, determine the software function of the writing object in the system according to the actual function of the writing object in reality, and generate functional attribute information. The functional attribute information may include writing/erasing, content color, handwriting thickness, and the like. Of course, the functional attribute information may also be determined by an external sensor or a functional button, which is not limited in the embodiment of the present invention. The data processing module 113 may be further configured to integrate the above coordinate information and the functional attribute information with time information corresponding to the coordinate information and a physical identifier (physical ID) of the infrared device in a data format designated by the system. Moreover, the data processing module 113 may further integrate some other information collected by other information collection modules (not shown in FIG. 1). The other information modules may be an audio pickup module or a video pickup module and the like, which is not limited in the embodiment of the present invention. The data processing module 113 stores the integrated data after the above processing in the local storage module, and sends the integrated data to the cloud server 120.

It shall be understood that the data processing module 113 may communicate with the cloud server 120 via a WLAN network or a mobile communication network. That is the infrared device 110 may communicate with the cloud server 120 via a or a mobile communication network, which is however not limited in the embodiment of the present invention.

Figure 2:
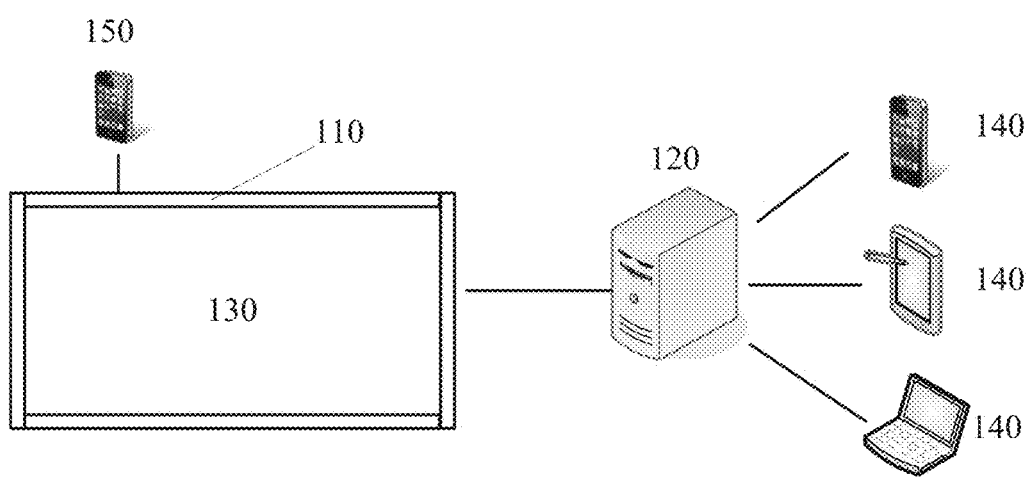
FIG. 2 is a schematic diagram for the application of a multi-user conferencing system according to an embodiment of the present invention.

FIG. 2 illustrates a schematic diagram for the application of a multi-user conferencing system according to an embodiment of the present invention. As shown in FIG. 2, the infrared device 110 in a frame shape may be placed on a writing bearing medium 130 (such as a white board, etc.); and an assisting device 150 (such as a cellphone, etc.) is used to communicatively connect the infrared device 110 to the cloud server 120. The infrared device 110 sends acquired coordinate information generated by a writing object that is operated by a user on the writing bearing medium 130 to the cloud server 120. The cloud server 120 records in time and stores integrated data generated by the data processing module 113 in the infrared device 110. The cloud server 120 is associated with a plurality of terminals 140 participating in a conference, and sends the current integrated data in the multi-user conferencing system 100 to the designated terminals 140. The terminals 140 may receive conference content through specific software on the terminals 140, such as WeChat, mail or an application client APP, etc. The plurality of terminals 140 bind with the cloud server 120 which designates a multi-user conferencing system through specific software, receive and parse the integrated data into coordinate information, size dimension information, etc., restore functional attribute information, and reproduce a writing process of the conference according to time information corresponding to the coordinate information.

Optionally, in the embodiment of the present invention, the network setting module 111 communicatively connects the infrared device 110 to the assisting device based on Bluetooth technology or infrared technology, and performs setting through a setting page provided by an application client on the assisting device so as to connect the infrared device 110 to the cloud server 120 or modify network setting of the infrared device 110.

Specifically, since the infrared device 110 in the embodiment of the present invention has no display screen, the assisting device 150 as shown in FIG. 2 may be cooperated to set network setting of the infrared device 110 through the setting page provided by the application client on the assisting device 150 so that the infrared device 110 is connected to the cloud server 120. Subsequently, the network setting of the infrared device 110 may be modified through the assisting device 150. The network setting module 111 may communicatively connect the infrared device 110 to the assisting device 150 based on Bluetooth technology or infrared technology. In addition, a corresponding program may also be run via a USB to perform network setting for the infrared device 110, which is not limited in the embodiment of the present invention.

Optionally, in the embodiment of the present invention, the infrared device 110 may further include a local storage module, and the local storage module is configured to record in time and store the integrated data currently corresponding to the writing bearing medium.

Specifically, since the infrared device 110 in the embodiment of the present invention has no display screen, for the convenience of user management of a conference, a local storage module may be set in the infrared device 110 to record in time and store the integrated data currently corresponding to one page of the writing bearing medium. Therefore, when a sudden power off or other emergencies occur, data stored in the local storage module may be processed to restore normal conference data. The data processing module may be specifically configured to send the integrated data corresponding to one page of the writing bearing medium that is stored in the local storage module to the cloud server when the page of the writing bearing medium has been written. Each time when one page of the writing bearing medium has been written, the data processing module may process the integrated data of the page stored in the local storage module, generate a conference file of the page, and which would be sent to the cloud server 120.

Optionally, in the embodiment of the present invention, the data processing module 113 sends the integrated data stored in the local storage module to the cloud server 120 when a power supply of the infrared ray position detecting module 112 is turned off, and the integrated data stored in the local storage module is not cleared.

Specifically, clearing processing is generally performed on a device memory when the device is powered off. In the embodiment of the present invention, when a power supply of the infrared ray position detecting module 112 is turned off, i.e., the infrared ray position detecting module 112 is powered off, the data processing module 113 sends the integrated data (data corresponding to the content on the writing bearing medium upon power off) stored in the local storage module to the cloud server 120. Meanwhile, the integrated data stored in the local storage module is not cleared, but continues to be processed after waiting for the infrared ray position detecting module 112 to be powered on once again. Therefore, it can ensure that writing content cannot be lost upon a sudden power off.

Optionally, in the embodiment of the present invention, the data processing module 113 is further configured to detect whether a currently acquired coordinate coincides with a coordinate in the integrated data stored in the local storage module, and when the currently acquired coordinate coincides with the coordinate in the integrated data stored in the local storage module, the data processing module 113 sends the integrated data stored in the local storage module to the cloud server 120, and deletes the integrated data in the local storage module that has already been sent to the cloud server 120.

Specifically, when the infrared ray position detecting module 112 is powered on again after being powered off, the data processing module 113 is configured to detect whether a coordinate currently acquired by the infrared ray position detecting module 112 coincides with a coordinate in the integrated data stored in the local storage module. If so, it indicates that the content of the writing bearing medium may have been erased during power off; in this case, the data processing module 113 sends the integrated data stored in the local storage module to the cloud server 120, and deletes the integrated data in the local storage module that has already been sent to the cloud server 120, that is, newly written content is considered to be a new page of writing content. In other words, when the data processing module 113 discovers that it renders content coinciding due to that current writing is writing performed in an existing writing content area in a certain rule, the data previously stored in the local storage module is stored in the cloud server 120, and the data in the local storage module is cleared, and the new content is stored as one newly established page. Therefore, the above embodiment takes into account the influence of device power on and off on data storage, thereby ensuring integrity of writing content during power on and off.

It shall be understood that in the embodiment of the present invention, the data processing module 113 may send the integrated data stored in the local storage module to the cloud server 120 in real time and the integrated data can be stored by the cloud server 120 in real time, or the data processing module 113 may send the integrated data to the cloud server 120 and the integrated data can be stored by the cloud server 120 after the local storage module has stored one page of the integrated data of the writing bearing medium. Different ways of sending and storing result in different processing procedures of the data processing module 113 and the cloud server 120, which not be repeated redundantly in the embodiment of the present invention.

Optionally, in the embodiment of the present invention, the integrated data includes a physical identifier for indicating the infrared device 110, and the cloud server 120 allocates a corresponding storage space for the infrared device 110 according to the physical identifier, and stores the integrated data in the storage space.

Specifically, when the data processing module 113 detects and receives the coordinate information generated by the infrared ray position detecting module 112, the coordinate information is integrated with the physical identifier indicating the infrared device 110 to form the integrated data. The data processing module 113 immediately connects, and sends the integrated data, to the cloud server 120. After receiving the integrated data, the cloud server 120 extracts a uniquely corresponding physical identifier (physical ID) of the infrared device 110 firstly, and allocates a uniquely corresponding storage space for the infrared device 110.

Optionally, in the embodiment of the present invention, the multi-user conferencing system 100 allocates a conference identifier for the conference, and the terminals input the conference identifier via an application client to access the conference.

Specifically, the multi-user conferencing system 100 allocates a conference identifier for the conference so that the terminals input the conference identifier via an application client to access the conference. It shall be understood that the conference identifier may be generated by the infrared device 110 (such as the data processing module 113), or may be correspondingly generated after the cloud server 120 receives the coordinate information in the conference content, which is not limited in the embodiment of the present invention. The terminals bind with the conference ID by inputting the conference identifier (the conference ID) or the conference ID and a corresponding conference access password so as to achieve an aim that the cloud server 120 sends conference content to the terminals participating in the conference. In addition, in the embodiment of the present invention, the terminals may also bind with the infrared device 110 by scanning a unique physical ID of the infrared device 110 so as to further achieve the aim of binding with the conference.

By the above behaviors, a user using the terminal needs to pass a security authentication process when wishing to acquire conference content, i.e., only a secure user is allowed to access writing content stored in the cloud server 120. The terminals may perform secure settings directly, or perform secure settings by combining other tools, for example, WeChat, Shake, and the like, thereby improving security. The cloud server 120 may provide rich sharing modes for the terminals, for example, real-time conference, conference file, mail, and the like, which is not limited in the embodiment of the present invention.

It shall be understood that the terminals may scan the infrared device 110 via a QR code, a bar code or Bluetooth, etc., which is not limited in the embodiment of the present invention. It shall be further understood that the binding of the terminals with the conference, and the binding of the terminals with the infrared device 110 in the embodiment of the present invention may be a correspondence in a form of an ID, for example, forming a table to form a correspondence, which is however not limited in the embodiment of the present invention.

It shall be understood that the data processing module 113 may integrate the coordinate information with time information corresponding to the coordinate information in a data format designated by the system to form the integrated data. The time information corresponding to the coordinate information may either be generated by a timer, or by other timing devices, which is not limited in the embodiment of the present invention.

Correspondingly, optionally, in the embodiment of the present invention, the integrated data includes coordinate information acquired by the infrared ray position detecting module 112 in time sequence, so that the terminals reproduce a writing process according to the coordinate information acquired in time sequence. Optionally, in the embodiment of the present invention, the integrated data includes the coordinate information and time information corresponding to the coordinate information, so that the terminals reproduce a writing process according to the time information and the coordinate information. The terminals receive the coordinate information and the time information sent by the cloud server 120, and perform a fast forward operation, a rewind operation or a reproduction operation from a specific moment in time on the writing content in the conference according to the coordinate information and the time information.

In other words, the time information may be indicated in an implicit manner, or in an explicit manner. As for the implicit indication, the coordinate information occupies n number of bits at an interval of 5 ms for example, and thus the first n bits denote coordinate information at the first 5 ms, and the second n bits denote coordinate information at the second 5 ms . . . and so on. This manner requires to fill up the coordinate information with a specific value at a window period in which a user does not write any content.

As for the explicit indication, the data processing module 113 may add the time information corresponding to the coordinate information to the integrated data. For example, a specific time value may be used, or a way of using a sequence number (the interval between every two sequence numbers is predefined) plus an initial time value may be used, which is however not limited in the embodiment of the present invention. In the embodiment of the present invention, the whole writing process can be reproduced more completely by adding the time information, thereby providing a user with better experience, rather than merely reproducing a final result of writing as in a conventional process.

Optionally, in the embodiment of the present invention, the infrared device 110 is further configured to be externally connected to an audio device so as to input or output audio data via the audio device. Alternatively, optionally, the infrared device 110 further includes an audio module so as to input or output audio data via the audio module.

Figure 3:
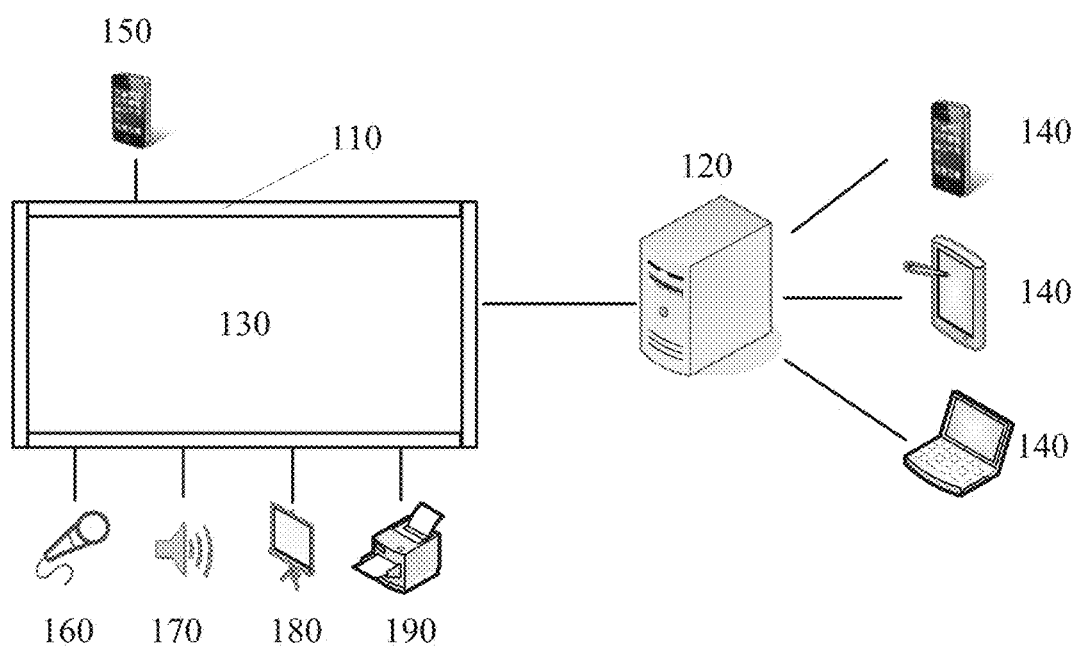
FIG. 3 is a schematic diagram for the application of a multi-user conferencing system according to an embodiment of the present invention.

Specifically, as shown in FIG. 3, the above audio device or audio module may include a microphone 160 and/or a loudspeaker 170. The microphone 160 may realize audio input of a user who is to perform writing during a conference. The loudspeaker 170 may help a client of a terminal to realize a feedback to an audio of a writing user. It shall be understood that the feedback may either be a real-time feedback, or a delayed feedback, and a function of the delayed feedback is similar to a function of an answering machine. In addition, the loudspeaker 170 may further be used to play a background music for the conference. The audio device or audio module enables reproduced conference content richer, while the loudspeaker may implement conference feedback capability better, thereby enhancing user experience.

It shall be understood that the audio device or audio module in the embodiment of the present invention, such as the microphone 160 and/or the loudspeaker 170, may further be built in the infrared device 110, or may be connected to the infrared device 110 via a line, a WLAN, Bluetooth technology or infrared technology. Data acquired by the microphone 160 may be integrated into integrated data, sent to the cloud server 120, and transmitted to a terminal participating in the conference.

Optionally, in the embodiment of the present invention, the infrared device 110 is further configured to be externally connected to a local reproduction device, and the data processing module 113 is further configured to send the integrated data to the local reproduction device so that the local reproduction device reproduces content of the conference locally according to the integrated data.

Specifically, as shown in FIG. 3, the infrared device 110 may further be externally connected to a local reproduction device, for example, a display 180 and a printer 190 in FIG. 3, etc. The infrared device 110 sends the integrated data generated by the conference to the local reproduction device through the data processing module 113. The local reproduction device reproduces the content of the conference locally according to the integrated data, which may further enhance user experience. For example, the content of the conference is reproduced locally through the display 180, or the printer is controlled by a corresponding program to print the conference content out through the printer. In addition, the local reproduction device may further render the reproduced content, such as scene simulation, augmented reality, etc., so as to enhance the conference effect. Optionally, the local reproduction device may be a display device or a printing device, which is however not limited in the embodiment of the present invention. It shall be understood that the local reproduction device may be connected to the infrared device 110 via a line, a WLAN, Bluetooth technology or infrared technology.

Optionally, in the embodiment of the present invention, in addition to the solution that the local reproduction device is connected to the infrared device 110 to receive the data of the infrared device 110, the data in the local reproduction device may also come from the cloud server 120. Correspondingly, the infrared device 120 is further configured to be communicatively connected to a local reproduction device, and the cloud server 120 sends the integrated data to the local reproduction device so that the local reproduction device reproduces content of the conference locally according to the integrated data.

In specific implementation, a user may issue a local reproduction indication via hardware such as a button on the infrared device 110 or software such as WeChat, APP, etc. If the local reproduction indication is issued by hardware such as a button on the infrared device 110, then, the infrared device 110 sends an indication message to the cloud server 120 to indicate the cloud server 120 to send the integrated data to the local reproduction device; and if the local reproduction indication is issued by software, the indication may either be sent to the infrared device 110 which sends an indication message to the cloud server 120, or the indication may be sent to the cloud server directly. It shall be understood that in the embodiment of the present invention, data of the local reproduction device may also come from the cloud server 120, this requires the local reproduction device to perform registration or binding at the cloud server 120 or the infrared device 110, and the way of registration or binding may be similar to the binding of the infrared device 110, the cloud server 120 and the terminals used by the user, which will not be repeated redundantly again this paper.

Therefore, a multi-user conferencing system provided by the embodiments of the present invention determines coordinate information of a writing object based on the influence of the writing object on a distribution situation of infrared rays of an infrared device when a user performs writing in a conference, and sends integrated data acquired after processing the coordinate information to a cloud server so that terminals participating in the conference reproduce writing content in the conference according to the integrated data. The multi-user conferencing system may transmit the conference content based on non-image data, thereby achieving remote push of the conference content, saving data traffic, and reducing demand of the conferencing system for network traffic. In addition, compared to an existing shooting or video mode, solutions of the embodiments of the present invention save traffic better, and reproduction efficiency is high, that is, sampling frequency in the solutions of the present embodiments is much higher in the case of the same data traffic.

Those of ordinary skill in the art may be aware that, units and algorithm steps of the examples described in the embodiments disclosed in this paper may be implemented by electronic hardware, computer software, or a combination of the two. Whether these functions are executed in hardware or software mode depends on the specific applications and design constraint conditions of the technical solution. Those skilled may implement the described functions by using different methods for each specific application, but this implementation should not be considered to be beyond the scope of the present invention.

Those skilled in the art to which the present invention pertains may clearly understand that, for the convenience and simplicity of description, for the specific working processes of the system, the apparatus and the units described above, please refer to corresponding processes in the foregoing method embodiments, and they will not be repeated redundantly herein.

In the several embodiments provided in the present application, it should be understood that, the disclosed system, device and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the respective embodiments of the present invention may be integrated in one processing unit, or the respective units singly exist physically or two or more units are integrated in one unit.

If the integrated unit is implemented in the form of the software functional unit and is sold or used as an independent product, it may be stored in a computer readable storage medium. Based on such understanding, the technical solution of the present invention substantially, or the part of the present invention making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present invention. The preceding storage mediums includes various media that can store program codes, such as, a U disk, a mobile hard disk, a read-only memory (Read-Only Memory, ROM), a random access memory (Random Access Memory, RAM), a magnetic disk, an optical disk, or the like.

Described above are the specific embodiments of the present invention only, the protection scope of the present invention is not limited to this, those skilled who are familiar with the art could readily think of variations or substitutions within the technical scope disclosed by the present invention, and these variations or substitutions shall fall within the protection scope of the present invention. Therefore, the protection scope of the present invention shall be defined by the claims.

What is claimed is:

1. A multi-user conferencing system, wherein the multi-user conferencing system comprises an infrared device and a cloud server, wherein the infrared device has no display screen and is placed on a writing bearing medium in use, the infrared device, the cloud server and terminals used by a plurality of users create and participate in a conference, the infrared device comprises a network setting module, an infrared ray position detecting module and a data processing module;

the network setting module is configured to communicatively connect the infrared device to an assisting device to assist the infrared device in connecting to the cloud server, so that the infrared device and the cloud server create the conference;

the infrared ray position detecting module is configured to determine, according to a distribution situation of infrared rays blocked by a writing object operated by a user on the writing bearing medium, coordinate information of the writing object on the writing bearing medium, and send the coordinate information to the data processing module;

the data processing module is configured to acquire integrated data after processing the coordinate information and send the integrated data to the cloud server; and the cloud server is configured to store the integrated data, and send the integrated data to the terminals so that the terminals reproduce writing content on the writing bearing medium according to the integrated data.

2. The multi-user conferencing system according to claim 1, wherein the network setting module communicatively connects the infrared device to the assisting device based on Bluetooth technology or infrared technology, and performs setting through a setting page provided by an application client on the assisting device so as to connect the infrared device to the cloud server or modify network setting of the infrared device.

3. The multi-user conferencing system according to claim 1, wherein the integrated data comprises a physical identifier for indicating the infrared device, and the cloud server allocates a corresponding storage space for the infrared device according to the physical identifier, and stores the integrated data in the storage space.

4. The multi-user conferencing system according to claim 1, wherein the multi-user conferencing system allocates a conference identifier for the conference, and the terminals input the conference identifier via an application client to access the conference.

5. The multi-user conferencing system according to claim 1, wherein the data processing module communicates with the cloud server via a WLAN network or a mobile communication network.

6. The multi-user conferencing system according to claim 1, wherein the integrated data comprises coordinate information acquired by the infrared ray position detecting module in time sequence, so that the terminals reproduce a writing process according to the coordinate information acquired in time sequence.

7. The multi-user conferencing system according to claim 1, wherein the integrated data comprises the coordinate information and time information corresponding to the coordinate information, so that the terminals reproduce a writing process according to the time information and the coordinate information.

8. The multi-user conferencing system according to claim 1, wherein the infrared device is further configured to be externally connected to an audio device so as to input or output audio data via the audio device.

9. The multi-user conferencing system according to claim 1, wherein the infrared device further comprises an audio module so as to input or output audio data via the audio module.

10. The multi-user conferencing system according to claim 1, wherein the infrared device is further configured to be externally connected to a local reproduction device, and the data processing module is further configured to send the integrated data to the local reproduction device so that the local reproduction device reproduces content of the conference locally according to the integrated data.

11. The multi-user conferencing system according to claim 1, wherein the cloud server is further configured to be communicatively connected to a local reproduction device, and the cloud server sends the integrated data to the local reproduction device so that the local reproduction device reproduces content of the conference locally according to the integrated data.

12. The multi-user conferencing system according to claim 10, wherein the local reproduction device is a display device or a printing device.

13. The multi-user conferencing system according to claim 11, wherein the local reproduction device is a display device or a printing device.

14. The multi-user conferencing system according to claim 10, wherein the local reproduction device is connected to the infrared device via a wired line, a WLAN, Bluetooth technology or infrared technology.

15. The multi-user conferencing system according to claim 1, wherein the infrared device further comprises a local storage module, and the local storage module is configured to record in time and store the integrated data currently corresponding to the writing bearing medium.

16. The multi-user conferencing system according to claim 15, wherein the data processing module is configured to send the integrated data corresponding to one page of the writing bearing medium that is stored in the local storage module to the cloud server when the page of the writing bearing medium has been written.

17. The multi-user conferencing system according to claim 15, wherein the data processing module sends the integrated data stored in the local storage module to the cloud server when a power supply of the infrared ray position detecting module is turned off, and the integrated data stored in the local storage module is not cleared.

18. The multi-user conferencing system according to claim 15, wherein the data processing module is further configured to detect whether a currently acquired coordinate coincides with a coordinate in the integrated data stored in the local storage module, and when the currently acquired coordinate coincides with the coordinate in the integrated data stored in the local storage module, the data processing module sends the integrated data stored in the local storage module to the cloud server, and deletes the integrated data in the local storage module that has already been sent to the cloud server.

* * * * *